(12) United States Patent
Jang et al.

(10) Patent No.: US 8,961,843 B2
(45) Date of Patent: Feb. 24, 2015

(54) CORE MATERIAL FOR VACUUM INSULATION PANEL AND METHOD OF MANUFACTURING THE SAME

(75) Inventors: Suk Jang, Seoul (KR); Seung-Min Jeon, Busan (KR)

(73) Assignee: LG Hausys, Ltd., Seoul (KR)

( * ) Notice: Subject to any disclaimer, the term of this patent is extended or adjusted under 35 U.S.C. 154(b) by 241 days.

(21) Appl. No.: 13/581,409

(22) PCT Filed: Feb. 25, 2011

(86) PCT No.: PCT/KR2011/001365
§ 371 (c)(1),
(2), (4) Date: Aug. 27, 2012

(87) PCT Pub. No.: WO2011/111939
PCT Pub. Date: Sep. 15, 2011

(65) Prior Publication Data
US 2012/0321834 A1    Dec. 20, 2012

(30) Foreign Application Priority Data
Mar. 9, 2010 (KR) .................. 10-2010-0021032

(51) Int. Cl.
*B28B 1/26* (2006.01)
*B28B 7/46* (2006.01)
*F16L 59/065* (2006.01)
*E04B 1/80* (2006.01)

(52) U.S. Cl.
CPC .............. *F16L 59/065* (2013.01); *E04B 1/803* (2013.01); *Y02B 80/12* (2013.01)
USPC ............................................. 264/87; 427/350

(58) Field of Classification Search
CPC .............................. F16L 59/065; E04B 1/803
USPC .................................. 428/69; 264/87; 427/350
See application file for complete search history.

(56) References Cited

U.S. PATENT DOCUMENTS 2,444,347 A * 6/1948 Greger et al. .............. 427/372.2
3,288,582 A * 11/1966 Wong et al. ..................... 65/451
5,869,407 A    2/1999 Rusek, Jr. et al.
(Continued)

FOREIGN PATENT DOCUMENTS

CN    1603730 A    4/2005
JP    H0632667 A    2/1994
(Continued)

OTHER PUBLICATIONS

European Patent Application No. 11753544.3, Extended European Search Report dated Nov. 21, 2014, seven (7) pages.

*Primary Examiner* — Alexander Thomas
(74) *Attorney, Agent, or Firm* — Nath, Goldberg & Meyer; Joshua B. Goldberg; Katelyn J. Bernier (57) ABSTRACT

The present invention relates to a core material for a vacuum insulation panel and a method of manufacturing the same. The method includes (a) preparing a solution of an inorganic binder; (b) dipping glass wool into the inorganic binder solution; (c) loading the glass wool on an upper portion of a chamber; (d) creating a vacuum in the chamber to discharge the inorganic binder solution from the glass wool into the chamber; and (e) drying and molding the glass wool into the form of a core material for manufacturing a vacuum insulation panel, thereby enhancing long term-durability of the vacuum insulation panel.

6 Claims, 7 Drawing Sheets

(56) References Cited

U.S. PATENT DOCUMENTS

| | | |
|---|---|---|
| 2007/0027283 A1 | 2/2007 | Swift et al. |
| 2007/0120282 A1* | 5/2007 | Covers ............................ 264/87 |

FOREIGN PATENT DOCUMENTS

| | | |
|---|---|---|
| JP | 2002275747 A | 9/2002 |
| JP | 2004150540 A | 5/2004 |
| JP | 2005036897 A | 2/2005 |
| JP | 2008008353 A | 1/2008 |
| JP | 2009264492 A | 11/2009 |
| JP | 2011038574 A | 2/2011 |
| KR | 10-1998-0703016 A | 9/1998 |
| KR | 10-2005-0033423 A | 4/2005 |
| KR | 10-2009-0066087 A | 6/2009 |
| KR | 10-0907043 B1 | 7/2009 |
| WO | 96/41048 A1 | 12/1996 |

* cited by examiner

CORE MATERIAL FOR VACUUM INSULATION PANEL AND METHOD OF MANUFACTURING THE SAME

This is a National Phase Application filed under 35 U.S.C. 371 as a national stage of PCT/KR2011/001365, filed Feb. 25, 2011, and claims priority from Korean Application No. 10-2010-0021032, filed Mar. 9, 2010, the content of each of which is hereby incorporated by reference in its entirety.

TECHNICAL FIELD

The present invention relates to a core material and a method of manufacturing the same, and more particularly to a method of manufacturing a vacuum insulation panel having long-term durability and low thermal conductivity, in which a core material forming the vacuum insulation panel is manufactured using glass wool by a dipping process with an inorganic binder solution, and materials and interlayer composition of a cover material and a getter are restructured.

BACKGROUND ART

A vacuum insulation panel is manufactured by placing a core material such as an open-cell rigid polyurethane foam or inorganic material in an encapsulation body formed of a composite plastic laminate film having excellent gas barrier performance, decompressing the interior of the encapsulation body, and heat-sealing a portion in which gas barrier films are layered on the circumferential edge.

Generally, vacuum insulation panel allows air or moisture to pass therethrough via an exterior encapsulation body or generates carbon dioxide or organic gas therein. As a result, the degree of vacuum in the vacuum insulation panel gradually decreases over time to increase thermal conductivity, thereby making it difficult to maintain sufficient insulation.

To solve such problems, for a conventional vacuum insulation panel, a core material is prepared using a mixture of a glass board, which is generally prepared by a wet process, and an organic binder with glass fiber.

For a cover material, there are commonly used typical vacuum packaging materials, in which a surface protection layer, a metal barrier layer, and an adhesive layer are stacked.

Here, the insulation pad is likely to undergo performance deterioration due to cracks of Al foil, that is, the metal barrier layer, at a bent portion in processing the vacuum insulation panel.

A getter includes materials capable of absorbing moisture only or absorbing both gas and moisture. The getter serves to maintain the degree of vacuum in the vacuum insulation panel through absorption performance of the materials and the amount of the materials applied thereto.

As described above, the conventional vacuum insulation panel using the mixture of the organic binder and the glass fiber as a core material has a lifespan of 8 years or less on the basis of a long-term durability of 0.010 Kal/mhr° C., causing a reliability problem when used for electronic appliances as well as the construction industry requiring a lifespan of at least 10 years.

Further, a wet process generates waste water and requires considerable costs in drying, and the organic binder type core material has low long-term durability.

DISCLOSURE

Technical Problem

The present invention is directed to providing a method of manufacturing a vacuum insulation panel which includes a core material, a cover material, and a getter material, wherein the core material is manufactured by dry-molding glass wool dipped in an inorganic binder solution and exhibits processability facilitating mass production using a vacuum chamber as well as excellent thermal insulation properties; the cover material is coated with a vinyl resin to improve gas barrier performance and blocking properties; and the getter material includes powdered lime to optimize hygroscopicity.

In addition, the present invention is directed to providing a vacuum insulation panel having a long-term durability of at least 10 years by optimizing the foregoing factors.

Technical Solution

In accordance with an aspect of the present invention, a method of manufacturing a core material for a vacuum insulation panel includes: (a) preparing a solution of an inorganic binder; (b) dipping glass wool into the inorganic binder solution; (c) loading the glass wool on an upper portion of a chamber; (d) creating a vacuum inside the chamber to discharge the inorganic binder solution from the glass wool into the chamber; and (e) drying and molding the glass wool into the form of the core material for manufacturing a vacuum insulation panel.

The inorganic binder may include at least one selected from cement, calcium sulfate, plaster, mud, clay, sodium silicate, alumina silicate, calcium silicate, and silica. The inorganic binder solution may be prepared using 0.5 to 4 wt % of the inorganic binder and the balance of water.

The step (d) and the step (e) may be conducted at the same time, and the drying is conducted at 300 to 450° C. for 5 to 15 minutes.

In the step (d), the glass wool may be reduced in thickness by the vacuum, and the glass wool may have a reduction ratio of 70 to 80%.

In accordance with one aspect of the present invention, there is provided a core material for a vacuum insulation panel, wherein the core material is prepared by the foregoing method and has glass wool structures combined with each other by an inorganic binder.

The core material may have a flat-plate board shape or a grooved-board shape having joints for bending, and the core material may have a thickness of 25 to 30 mm.

In accordance with a further aspect of the present invention, a vacuum insulation panel includes a core material prepared by the foregoing method, a cover material vacuum-packaging the core material and having a structure in which a surface protection layer, a metal barrier layer and an adhesive layer are stacked, and a getter disposed between the core material and the cover material and attached to or inserted into the core material.

The core material may be used in the form of two or three stacked layers, and the surface protection layer of the cover material may have a structure in which a polyethylene terephthalate (PET) film and a nylon film are stacked.

A vinyl resin may be applied to an upper side of the PET film, and the vinyl resin may include at least one selected from polyvinyl chloride (PVC), polyvinyl acetate (PVA), polyvinyl alcohol (PVAL), polyvinyl butyral (or PVB), and polyvinylidene chloride (PVDC).

The metal barrier layer of the cover material may be aluminum (Al) foil, the adhesive layer of the cover material may include at least one plastic film selected from high-density polyethylene (HDPE), low-density polyethylene (LDPE), linear low-density polyethylene (LLDPE), cast polypropylene (CPP), oriented polypropylene (OPP), polyvinylidene chloride (PVDC), polyvinyl chloride (PVC), ethylene vinyl acetate (EVA) copolymer, and ethylene vinyl alcohol (EVOH) copolymer films. Here, the surface protection layer, the metal barrier layer, and the adhesive layer of the cover material may be bonded to each other by a polyurethane resin.

The getter may be calcium oxide (CaO) powder having a purity of at least 95% packed in a pouch, and the pouch may be formed of nonwoven fabrics impregnated with crepe paper and polypropylene (PP). The getter may have a moisture absorptivity of at least 25%, and the degree of vacuum used for vacuum-packaging may be 0.1 to 10 Pa.

Advantageous Effects

In the method of manufacturing a core material for a vacuum insulation panel according to the present invention, the core material is manufactured using glass wool having excellent initial thermal conductivity by a dipping process using an inorganic binder solution, thereby preventing formation of an irregular surface in processing a vacuum insulation panel and improving long-term durability.

In addition, the process may be conducted at a relatively low temperature ranging from 300 to 450° C. without thermal compression, thereby relieving process conditions, and the inorganic binder solution collected by a vacuum may be reused, thereby reducing process costs.

Further, in the vacuum insulation panel according to the present invention, a vinyl resin is applied to an upper portion of a surface protection layer of a cover material to prevent defects by Al foil while improving gas barrier performance and blocking properties.

Further, in the method of manufacturing a vacuum insulation panel according to the present invention, high-purity calcium oxide powder is used for a getter material to secure a moisture absorptivity of at least 25% with a small amount, optimally maintaining the degree of vacuum in the vacuum insulation panel.

Moreover, the vacuum insulation panel according to the present invention may increase long-term durability to at least 10 years due to characteristics of the core material and other materials.

BEST MODE

The present invention is aimed at optimizing not only a core material but also a cover material and a getter so as to manufacture a vacuum insulation panel having excellent long-term durability.

Embodiments of the present invention will now be described in more detail with reference to the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

A method of manufacturing a core material for a vacuum insulation panel according to the present invention includes: dipping glass wool into an inorganic binder solution; removing the inorganic binder solution from the glass wool absorbing the inorganic binder solution; and drying the glass wool.

Next, a cover material is formed to have a structure in which a surface protection layer, a metal barrier layer, and an adhesive layer are stacked.

Then, a getter is formed by packaging calcium oxide (CaO) powder in a pouch.

Then, the getter is attached to an upper portion of the core material or placed onto the surface of the core material, and an encapsulation body is formed using the cover material, followed by putting the core material in the encapsulation body and sealing the body in a vacuum, thereby providing a vacuum insulation panel.

Next, the method of manufacturing the core material and the structure of the core material according to the present invention will be described in more detail.

Figure 1:
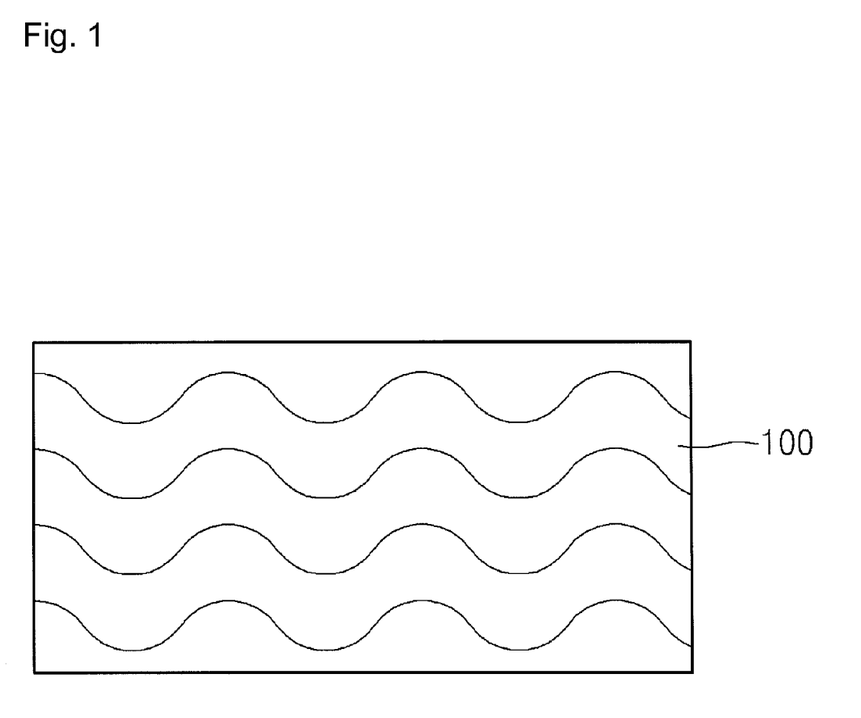
FIGS. 1 to 3 are cross-sectional views of a core material for a vacuum insulation panel and a method of manufacturing the same according to the present invention.
Figure 2:
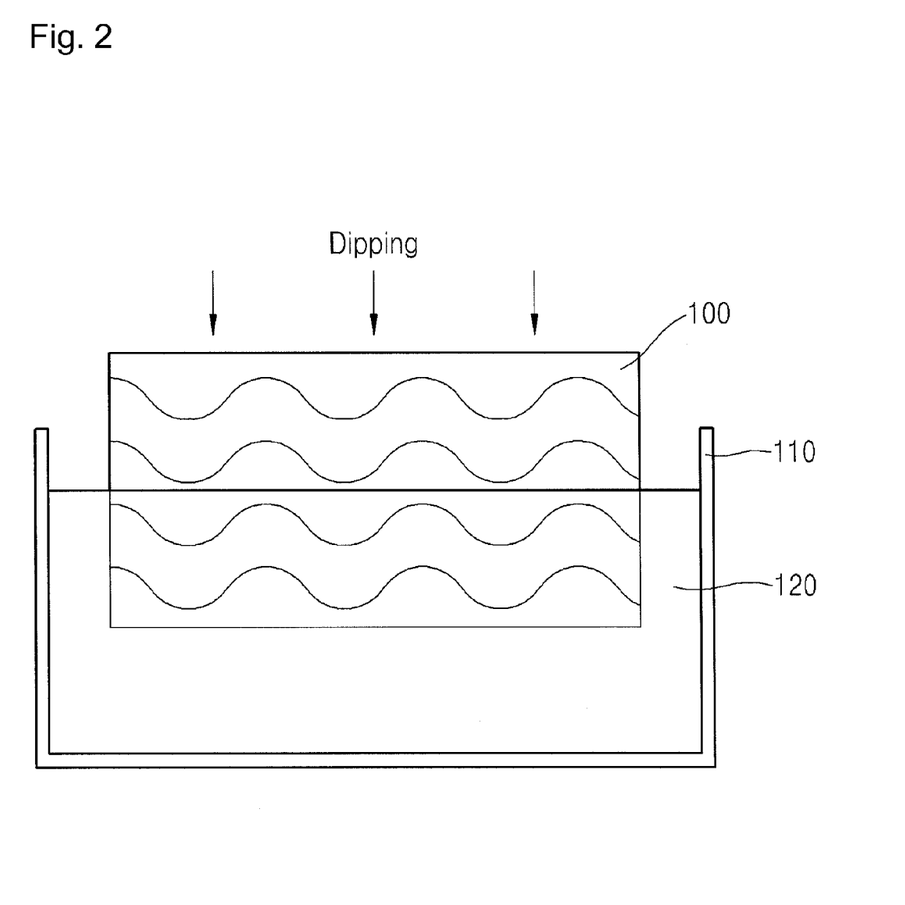
Figure 3:
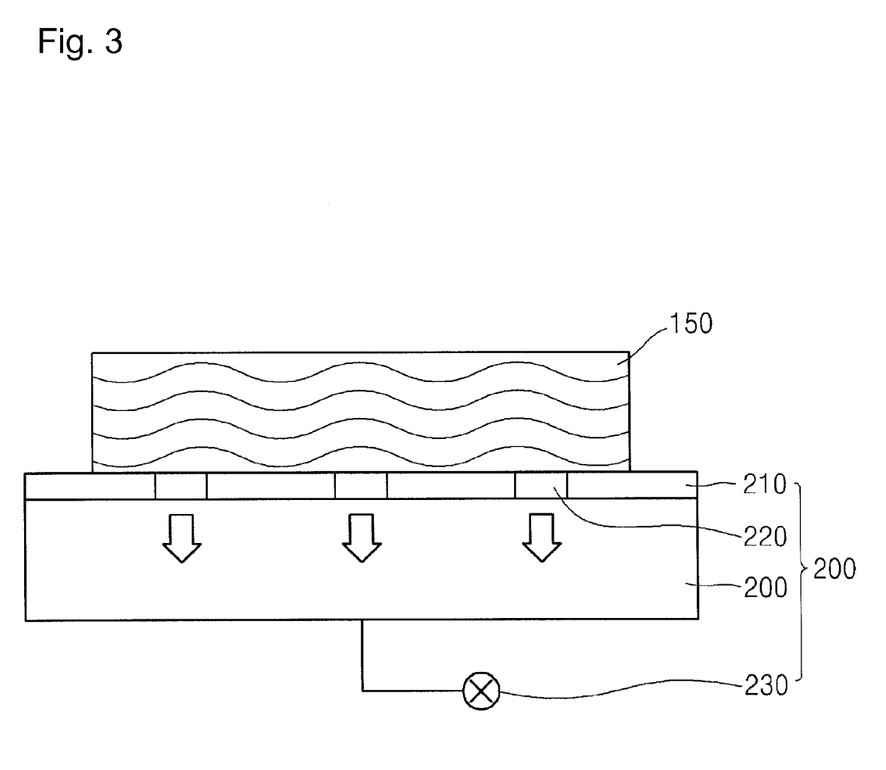

FIGS. 1 to 3 are cross-sectional views of a core material for a vacuum insulation panel and a method of manufacturing the same according to the invention.

Referring to FIG. 1, glass wool 100 having a rough shape of the core material to be formed is prepared. One example of the glass wool 100 is glass wool. Glass wool fabrics having a thickness of 80 to 120 mm may be used.

Here, the glass silk fabrics may be cut into the shape of a rectangle, circle, or the like depending on the shape of the vacuum insulation panel.

Next, referring to FIG. 2, an inorganic binder solution 120, prepared by mixing an inorganic binder with a solution, is put in a tank 110, and the glass wool 100 is dipped into the inorganic binder solution 120. In the dipping process, the glass wool 100 may be dipped into the solution by sequentially putting upper and lower halves of the glass wool in the solution, or by completely putting the entirety of the glass wool, as shown in FIG. 1.

Here, the inorganic binder included in the inorganic binder solution 120 may include at least one material selected from cement, calcium sulfate, plaster, mud, clay, sodium silicate, alumina silicate, calcium silicate, and silica. These materials are generally mixed with water to function as strong adhesives. In the present invention, such an adhesive inorganic binder solution is prepared to form the glass wool 100 into a suitable board shape as a core material. Here, a suitable ratio of the inorganic binder to water may range from 0.5 to 4 wt %. If the amount of the inorganic binder is less than 0.5 wt %, adhesion of the inorganic binder decreases, thereby making it difficult to manufacture a suitable core material for the vacuum insulation panel. If the amount of the inorganic binder is greater than 4 wt %, thermal conductivity of the core material drastically increases, thereby exhibiting inappropriate thermal performance.

Such effects will be described in more detail with reference to Table 2. Next, a method of forming the glass wool 100 dipped in the inorganic binder solvent 120 into the shape of the core material will be described.

Referring to FIG. 3, the glass wool 100 which evenly absorbs the inorganic binder solution is loaded onto an upper substrate 210 of a chamber 250 including a vacuum pump 230. Here, the upper substrate 210 of the chamber 250 includes a plurality of vacuum inlets 220 and has a vacuum space 200 at a lower portion thereof.

Thus, when the pressure in the vacuum space 200 is reduced by the vacuum pump 230, the inorganic binder solution 120 absorbed into the glass wool 100 is discharged into the vacuum space 200.

In this process, the glass wool 100 is naturally compressed and cured into the form of the core material 150. Here, drying is carried out at 300 to 450° C. for 5 to 15 minutes such that the inorganic binder solution 120 is thoroughly removed from the glass wool 100.

If the drying temperature is less than 300° C. or drying time is less than 5 minutes, it is difficult to completely remove the inorganic binder solution 120. If drying temperature is greater than 450° C. or drying time is greater than 15 minutes, drying merely continues even after the glass wool 100 is completely dried, causing unnecessary waste of energy.

Such a drying process is performed at a lower heating temperature than conventional thermal compression, enabling energy conservation, and needs less force for compression, making the manufacturing process of the core material 150 more efficient.

Here, in a process of forming the glass wool 100 into the form of the core material 150, a flat-plate board may be obtained in a reduction ratio of 70 to 80% via simple vacuum absorption.

Here, an additional mold may be prepared in order to make various shapes of the surface of the flat-plate board or to further increase the reduction ratio. In particular, since a grooved board needs to have intermediate joints for bending, compression parts are formed in the form of partitions in a mold such that intermediate grooves may be formed in the core material.

After the core material is prepared, a cover material is formed to constitute an encapsulation body surrounding the core material. Next, the shape of the cover material and a method of manufacturing the same will be described in more detail.

The cover material includes an adhesive layer, a metal barrier layer, and a surface protection layer, which are sequentially formed. The adhesive layer may be defined as a layer formed inside the encapsulation body, and the surface protection layer may be defined as a layer exposed to the outside.

Further, the adhesive layer is a layer to be thermally welded to each other by heat sealing, and functions to maintain a vacuum. Thus, the adhesive layer is formed of at least one thermoplastic plastic film selected from high-density polyethylene (HDPE), low-density polyethylene (LDPE), linear low-density polyethylene (LLDPE), casting polypropylene (CPP), oriented polypropylene (OPP), polyvinylidene chloride (PVDC), polyvinyl chloride (PVC), ethylene vinyl acetate (EVA) copolymer, and ethylene vinyl alcohol (EVOH) copolymer films, and may have a thickness of 1 to 100 μm to provide sufficient sealing property.

Next, a thin metal layer having a thickness of 6 to 7 μm is formed on the adhesive layer as a barrier layer for blocking gas and protecting the core material. Here, a metal barrier layer of Al foil is commonly used. Since there is not yet known a thin film having superior characteristics to Al foil, Al foil may be used in embodiments of the invention. Here, Al is a metal and thus can cause generation of cracks when bent. To prevent cracks, the surface protection layer is formed on the metal barrier layer.

The surface protection layer of the cover material according to the present invention may have a structure in which a PET film having a thickness of 10 to 14 μm and a nylon film having a thickness of 20 to 30 μm are stacked.

In this case, if cracks are seriously generated in the metal barrier layer, the PET and nylon films can be damaged. In some embodiments, a vinyl resin layer may be formed on the PET film to prevent such damage.

Next, the surface protection layer of the cover material according to the present invention may have a stacked structure of a PET layer and a vinyl resin layer, which form an outermost film. Here, the vinyl resin layer may include a vinyl resin containing at least one selected from polyvinyl chloride (PVC), polyvinyl acetate (PVA), polyvinyl alcohol (PVAL), polyvinyl butyral (or PVB), and polyvinylidene chloride (PVDC).

In addition, the surface protection layer, the metal barrier layer, and the adhesive layer may be bonded to each other by a polyurethane (PU) resin so as to further enhance air-tightness of the cover material.

As such, the vacuum insulation pad according to the embodiments of the invention may have optimal air tightness and long-term durability through formation of the cover material.

Here, gas or moisture may be generated in the cover material by external temperature change. A getter is used to prevent generation of gas or moisture, and will be described below.

Figure 4:
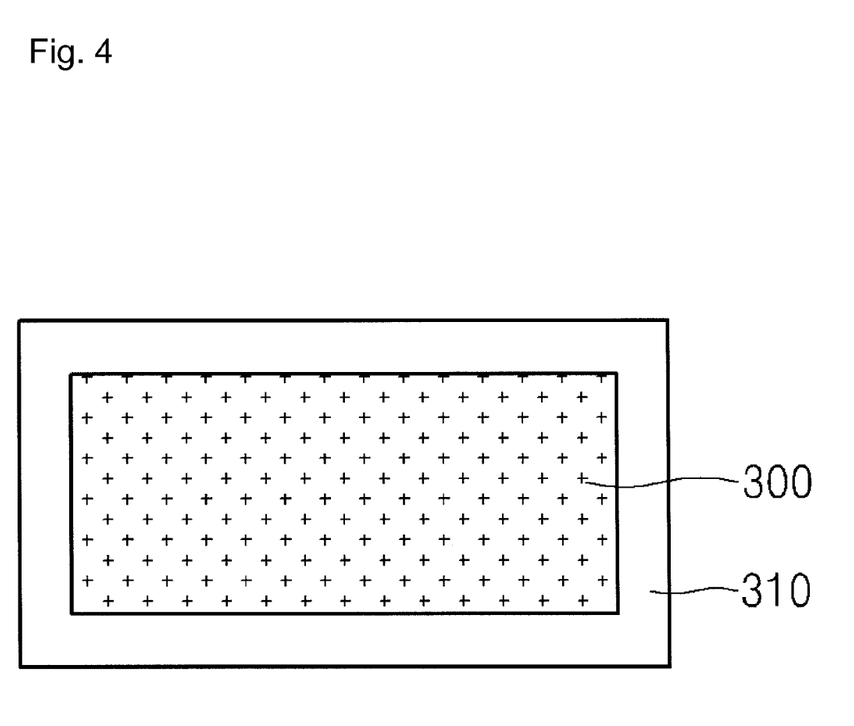
FIG. 4 is a plan view of a getter included in a vacuum insulation panel according to the present invention.

FIG. 4 is a plan view of a getter included in the vacuum insulation panel according to the present invention.

FIG. 4 shows calcium oxide (CaO) 300 put in a pouch 310. In one embodiment of the invention, calcium oxide powder having a purity of at least 95% is used and the pouch 310 is formed of nonwoven fabrics impregnated with crepe paper and polypropylene (PP) to secure a moisture absorptivity of at least 25%. Here, the getter may have a thickness of 2 mm or less in consideration of the thickness of the entire insulation pad.

The core material, the cover material, and the getter are all prepared as described above and combined into a vacuum insulation pad.

After the cover material is formed into the encapsulation body, the core material is placed inside the encapsulation body and sealed in a vacuum. Here, the getter may be attached to the surface of the core material or be partly embedded in the core material, as shown in FIGS. 5 and 6.

The degree of vacuum in the encapsulation body may be 0.1 to 10 Pa. If the degree of vacuum is less than 1.0 Pa, production efficiency can decrease. If the degree of the vacuum is greater than 10 Pa, initial thermal performance and long-term durability can be deteriorated.

Figure 5:
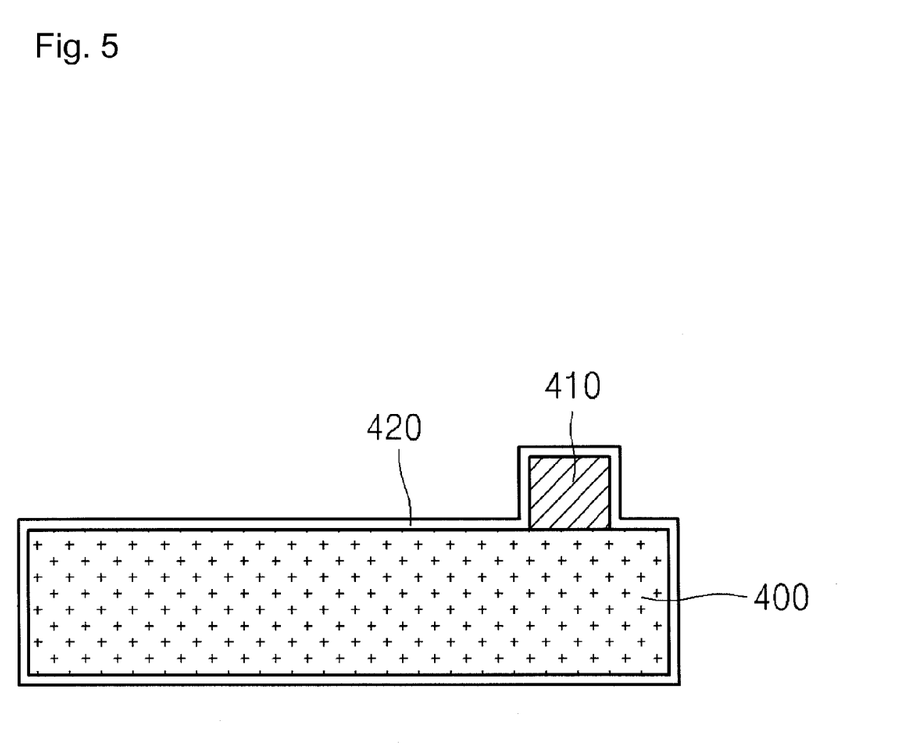
FIGS. 5 and 6 are cross-sectional views of a vacuum insulation panel and a method of manufacturing the same according to the present invention.
Figure 6:
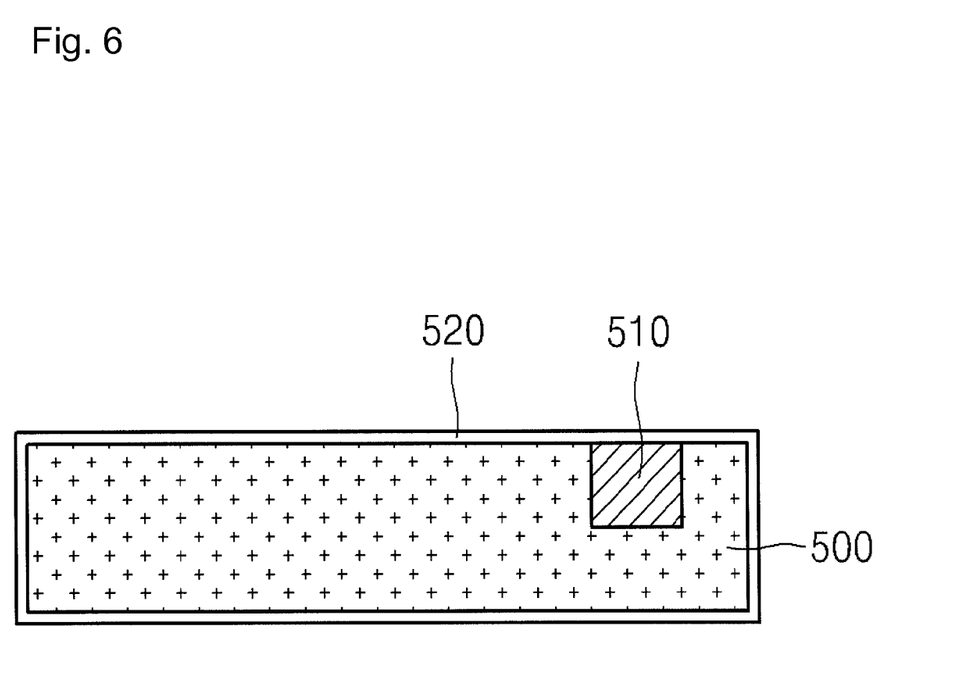

FIGS. 5 and 6 are cross-sectional views of a vacuum insulation panel and a method of manufacturing the same according to the present invention.

FIG. 5 shows a vacuum insulation panel which is sealed using the cover material 420, with a getter 410 attached to the surface of a core material 400, and FIG. 6 shows a vacuum insulation panel which is sealed using a cover material 520, with a getter 510 inserted into a core material 500.

The vacuum insulation panels thus prepared exhibit excellent long-term durability, examples of which will be illustrated as follows.

EXAMPLE 1

First, a glass wool-type core material as described in FIG. 3 was prepared in a 25×300×400 mm (thickness×width×length) size and used for a vacuum insulation panel.

Here, for an inorganic binder solution, silica was used as an inorganic binder and prepared in the form of a sol to be properly mixed with water. Next, a silica sol aqueous solution was prepared by mixing 4 wt % of silica sol and the balance of water.

Then, a covering encapsulation body was formed in a structure of a 12 μm polyvinylidene chloride (PVDC)/polyethylene terephthalate (PET) film, a 25 μm nylon film, 6 μm foil, and a 50 μm linear low-density polyethylene (LLDPE) film.

Then, two getters, obtained by putting 25 g of carbon oxide (CaO) having a purity of 95% in a pouch, were inserted into the core material on the surface thereof, as shown in FIG. 6.

Then, the core material was placed in an encapsulation body and sealed at a degree of vacuum of 10 Pa, thereby producing a vacuum insulation panel according to the present invention.

EXAMPLE 2

A vacuum insulation panel was prepared in the same manner as in Example 1 except that a silica sol aqueous solution was prepared by mixing 2 wt % of silica sol and the balance of water.

EXAMPLE 3

A vacuum insulation panel was prepared in the same manner as in Example 1 except that a silica sol aqueous solution was prepared by mixing 1 wt % of silica sol and the balance of water.

EXAMPLE 4

A vacuum insulation panel was prepared in the same manner as in Example 1 except that a silica sol aqueous solution was prepared by mixing 0.5 wt % of silica sol and the balance of water.

COMPARATIVE EXAMPLE 1

Glass wool was prepared at 500° C. by thermal compression to prepare a 25×300×400 mm (thickness×width×length) core material for a vacuum insulation panel.

Then, a cover material and getters were prepared in the same manner as in Example 1 and the same sealing process was used as well, thereby producing a vacuum insulation panel.

COMPARATIVE EXAMPLE 2

Glass wool was formed by a wet method using an organic binder to prepare a 25×300×400 mm (thickness×width×length) core material for a vacuum insulation panel.

Then, a cover material and getters were prepared in the same manner as in Example 1 and the same sealing process was used as well, thereby producing a vacuum insulation panel.

COMPARATIVE EXAMPLE 3

A vacuum insulation panel was prepared in the same manner as in Example 1 except that a silica sol aqueous solution was prepared by mixing 4.1 wt % of silica sol and the balance of water.

COMPARATIVE EXAMPLE 4

A vacuum insulation panel was prepared in the same manner as in Example 1 except that a silica sol aqueous solution was prepared by mixing 0.4 wt % of silica sol and the balance of water.

[Performance Testing and Evaluation]

Each of the vacuum insulation panels according to Examples 1 and 2 and Comparative Examples 1 and 2 was subjected to aging at 70° C. for 14 hours and then stored in a constant-temperature chamber at 85° C. for 10 days, followed by evaluation of thermal conductivity while comparing with non-heated ones. Here, a thermal conductivity tester, HC-074-300 (EKO Instruments Co., Ltd.), was used to measure thermal conductivity. Thermal conductivities after 0 to 10 years were predicted by applying an acceleration factor and results are shown in Table 1 and FIG. 7.

In addition, the thermal conductivity of each of the vacuum insulation panels according to Examples 1 to 4 and Comparative Examples 1 and 2 is shown in Table 2.

TABLE 1

| | Thermal conductivity (Kcal/mhr ° C.) | | | | | |
|---|---|---|---|---|---|---|
| | Initial | 2 years | 4 years | 6 years | 8 years | 10 years |
| Example 1 | 0.0031 | 0.0035 | 0.0041 | 0.0049 | 0.0058 | 0.0060 |
| Comparative Example 1 | 0.0031 | 0.0045 | 0.0061 | 0.0075 | 0.0095 | 0.0100 |
| Example 2 | 0.0027 | 0.0033 | 0.0039 | 0.0044 | 0.0058 | 0.0060 |
| Comparative Example 2 | 0.0035 | 0.0046 | 0.0066 | 0.0079 | 0.0097 | 0.0100 |

TABLE 2

| | Comparative Example 3 (4.1 wt %) | Example 1 (4 wt %) | Example 3 (2 wt %) | Example 4 (1 wt %) | Example 2 (0.5 wt %) | Comparative Example 4 (0.4 wt %) |
|---|---|---|---|---|---|---|
| Content of inorganic binder | | | | | | |
| Thermal conductivity (Kcal/mhr° C.) | 0.005 | 0.0035 | 0.0031 | 0.0031 | 0.0027 | — |

Figure 7:
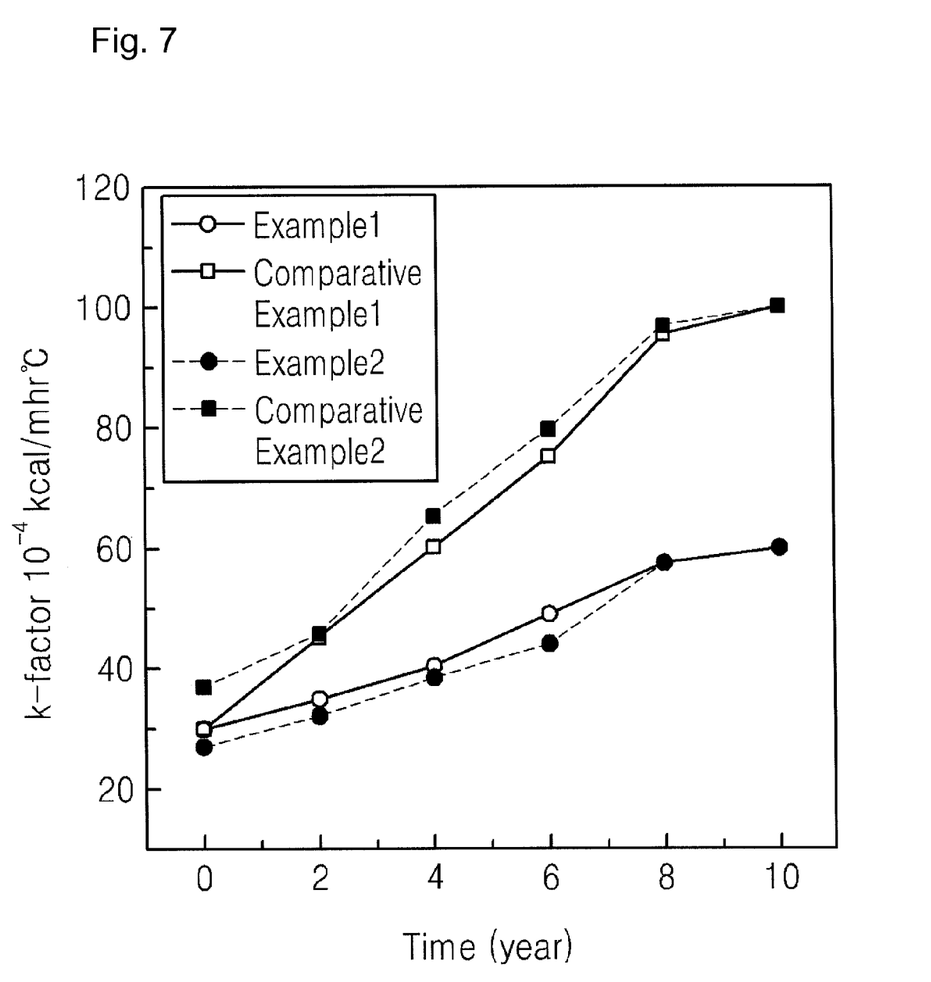
FIG. 7 is a graph depicting long-term durability of vacuum insulation panels according to Examples and Comparative Examples.

FIG. 7 is a graph depicting long-term durability of the vacuum insulation panels according to the examples and the comparative examples.

As shown in Table 1 and FIG. 7, the thermal conductivities of the vacuum insulation panels according to Comparative Examples 1 and 2 increase drastically over time, whereas the thermal conductivities of the vacuum insulation panels according to Examples 1 and 2 increase gradually.

Further, as to thermal conductivity after 10 years, the panel according to Example 1 has 0.006 Kcal/mhr° C., which is still excellent vacuum insulation, while the panel according to Comparative Example 1 increases to about a half of the thermal conductivity of general polyurethane foam, 0.01 Kcal/ mhr° C., exhibiting considerably deteriorated vacuum insulation. In addition, since the graph shows a linearly increasing change, it is easily predicted that the panels according to Example 2 and Comparative Example 2 change in a similar manner to in Example 1 and Comparative Example.

Therefore, the vacuum insulation panels according to the present invention have a structure optimizing insulation properties and effects of increasing long-term durability to at least 10 years.

Also, Table 2 shows that a suitable ratio of the inorganic binder to the solution is 0.5 to 4 wt %. If the amount of the inorganic binder is less than 0.5 wt %, adhesion of the inorganic binder decreases, thereby making it difficult to form a suitable core material for forming a vacuum insulation panel.

Further, if the amount of the inorganic binder is greater than 4 wt %, the core material exhibits improper thermal performance for a vacuum insulation panel due to drastic increase in thermal conductivity.

Although some exemplary embodiments of the present invention have been described with reference to the accompanying drawings, the invention may be embodied in many different ways and should not be construed as being limited to the embodiments set forth herein. It will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be in any way construed as limiting the present invention.

The invention claimed is:

1. A method of manufacturing a core material for a vacuum insulation panel, comprising:
    (a) preparing a solution of an inorganic binder using 0.5 to 4 wt % of the inorganic binder to a balance of water;
    (b) dipping glass wool into the inorganic binder solution;
    (c) loading the glass wool on an upper portion of a chamber;
    (d) creating a vacuum in the chamber to discharge the inorganic binder solution from the glass wool into the chamber; and
    (e) drying and molding the glass wool into the form of a core material for manufacturing a vacuum insulation panel.

2. The method of claim 1, wherein the inorganic binder comprises at least one selected from cement, calcium sulfate, plaster, mud, clay, sodium silicate, alumina silicate, calcium silicate, and silica.

3. The method of claim 1, wherein the step (d) and the step (e) are conducted at the same time.

4. The method of claim 1, wherein the drying is conducted at 300 to 450° C. for 5 to 15 minutes.

5. The method of claim 1, wherein, in the step (d), the glass wool is reduced in thickness by the vacuum.

6. The method of claim 5, wherein the glass wool has a reduction ratio of 70 to 80%.

* * * * *